United States Patent [19]
Gouttebessis et al.

[11] Patent Number: 5,363,894
[45] Date of Patent: Nov. 15, 1994

[54] SAFETY SUPPORT TO BE INCORPORATED INSIDE A TIRE

[75] Inventors: Jacques Gouttebessis, Volvic; Guy Jouve, Cournon-D'Auvergne, both of France

[73] Assignee: Compagnie Generale des Etablissements Michelin-Michelin & Cie, Clermont-Ferrand, France

[21] Appl. No.: 22,595

[22] Filed: Feb. 17, 1993

Related U.S. Application Data

[63] Continuation of Ser. No. 700,878, May 10, 1991, abandoned, which is a continuation of Ser. No. 405,325, Sep. 11, 1989, abandoned.

[30] Foreign Application Priority Data

Sep. 15, 1988 [FR] France ................... 88 12299

[51] Int. Cl.$^5$ ................................................ B60C 5/00
[52] U.S. Cl. ................................ 152/158; 152/379.4
[58] Field of Search ..................... 152/156-158, 152/516-518, 520, 521, 379.4, 381.4, 381.5, 381.6; 301/9.2

[56] References Cited

U.S. PATENT DOCUMENTS

| | | | |
|---|---|---|---|
| 2,275,897 | 3/1942 | Gifford | 301/9.2 |
| 2,291,156 | 7/1942 | Heesch et al. | 301/9.2 |
| 2,294,256 | 8/1942 | Uber | 301/9.2 |
| 2,401,579 | 11/1946 | Haag | 301/9.2 |
| 2,467,482 | 4/1949 | Hutchings | 301/9.2 |
| 2,486,970 | 11/1949 | Nordenson | 301/9.2 |
| 2,877,055 | 3/1959 | Tomik | 301/9.2 |
| 2,934,127 | 4/1960 | Howard | 152/427 |
| 2,987,093 | 6/1961 | Urbon | 152/521 |
| 3,682,218 | 8/1972 | Johannsen | 152/158 |
| 3,990,491 | 11/1976 | Hampshire | 152/520 |
| 4,029,137 | 6/1977 | Suydain | 152/539 |
| 4,183,388 | 1/1980 | Cassidy | 152/520 |
| 4,197,892 | 4/1980 | Boileau | 152/158 |
| 4,212,339 | 7/1980 | Dobson | 152/158 |
| 4,318,435 | 3/1982 | Heath-Coleman | 152/520 |
| 4,418,734 | 12/1983 | Dobson | 152/520 |
| 4,462,447 | 7/1984 | Siefert et al. | 152/539 |
| 4,592,403 | 6/1986 | Stein et al. | 152/520 |
| 4,674,549 | 6/1987 | Bush | 152/520 |
| 5,033,524 | 7/1991 | Ohtsuka | 152/539 |

FOREIGN PATENT DOCUMENTS

| | | | |
|---|---|---|---|
| 2282346 | 3/1979 | France. | |
| 956380 | 1/1957 | Germany. | |
| 2529137 | 1/1976 | Germany. | |
| 2909057 | 10/1979 | Germany. | |
| 3322097 | 2/1984 | Germany | 152/520 |
| 68367 | 11/1973 | Luxembourg. | |

OTHER PUBLICATIONS

"Tire Design Guide" by Tire & Rim Association 1978, pp. 96–98, 101.

Primary Examiner—Nancy T. Krawczyk
Attorney, Agent, or Firm—Oblon, Spivak, McClelland, Maier & Neustadt

[57] ABSTRACT

A safety support for supporting the tread of a vehicle tire in case of the loss of inflation pressure of the tire has the shape of a Z. The base of the support is fixed to a wheel rim while the connector between the support base and the support top is oriented so as to join the base on a side thereof opposite that facing the vehicle to which the tire is mounted. The asymmetric shape of the support and its orientation produces improved stability upon intervention of the support.

12 Claims, 5 Drawing Sheets

SAFETY SUPPORT TO BE INCORPORATED INSIDE A TIRE

This application is a continuation of application Ser. No. 07/700,878, filed on May 10, 1991, now abandoned, which is a continuation of Ser. No. 405,325, filed on Sep. 11, 1989, now abandoned.

BACKGROUND OF THE INVENTION

1. Field of the Invention

This invention relates to the use of tires after blowout or in case of significant loss of pressure. It proposes a safety support that is mounted on the rim, inside the tire, to take up the load in case of failure of said tire.

2. Background of the Related Art

Among the very many supports of this type, there can be cited French patent publication FR 2 297 738, which shows a support in two parts that can be mounted on a rim in a single piece, of the type having a mounting groove. There can also be cited United Stated patent publication U.S. Pat. No. 4,197,892 which shows a support to be used on a rim with a removable edge. The success of these supports remains extremely limited because when they fulfill their role of load relief support of the tire when it is failing, their intervention causes instabilities in the behavior of the vehicles and therefore a degradation of the road stability performance.

To eliminate this drawback, United States patent publication U.S. Pat. No. 4,461,333 proposes a support, one part of which is extended to hold the tread axially. This support provides good road stability performances but it is complex and therefore costly to produce, which limits its use.

SUMMARY OF THE INVENTION

It is an object of the present invention to provide a safety support for supporting the tread of a vehicle tire in case of loss of inflation pressure of the tire, whose cost is low.

It is a further object of the invention to provide such a safety support having a gradual intervention.

It is yet a further object of the present invention to provide such a safety support which imparts an excellent level of road stability.

It is yet another object of the present invention to provide a method for mounting such a safety support on a wheel.

According to the present invention, the above and other objects are achieved by a safety support for supporting the tread of a vehicle tire in case of loss of inflation pressure of the vehicle tire, comprising a base fixed to a rim of a wheel having means for mounting the wheel to a vehicle such that an inside axial side of the wheel faces toward the vehicle and an outside axial side of the wheel faces away from the vehicle. A substantially cylindrical top is normally positioned radially outside of the base in substantial axial alignment with the base and with an axis substantially coaxial with the wheel axis. The top is normally radially spaced from the base such that when the support is positioned within a tire mounted to the vehicle rim, a radial clearance exists between the top and the tire tread. A connection between the base and the top comprises means for permitting a relative movement between the base and the top. The connection joins the base at an outside axial side thereof and joins the top at an inside axial side thereof, relative to a plane perpendicular to the wheel axis and passing through an axial middle of the top. As a result, a resultant of forces acting on the top moves axially toward the inside side of the wheel during the relative movement of the top toward the base.

According to another feature of the invention, a method for mounting a safety support having a substantially Z shape to a vehicle wheel comprises the steps of fitting a top of the support in a tire, fixing a base of the support to the wheel rim, and mounting the wheel to a vehicle such that the joint between the support base and the connector between the base and a support top faces away from the vehicle.

DETAILED DESCRIPTION OF THE PREFERRED EMBODIMENTS

Figure 1:
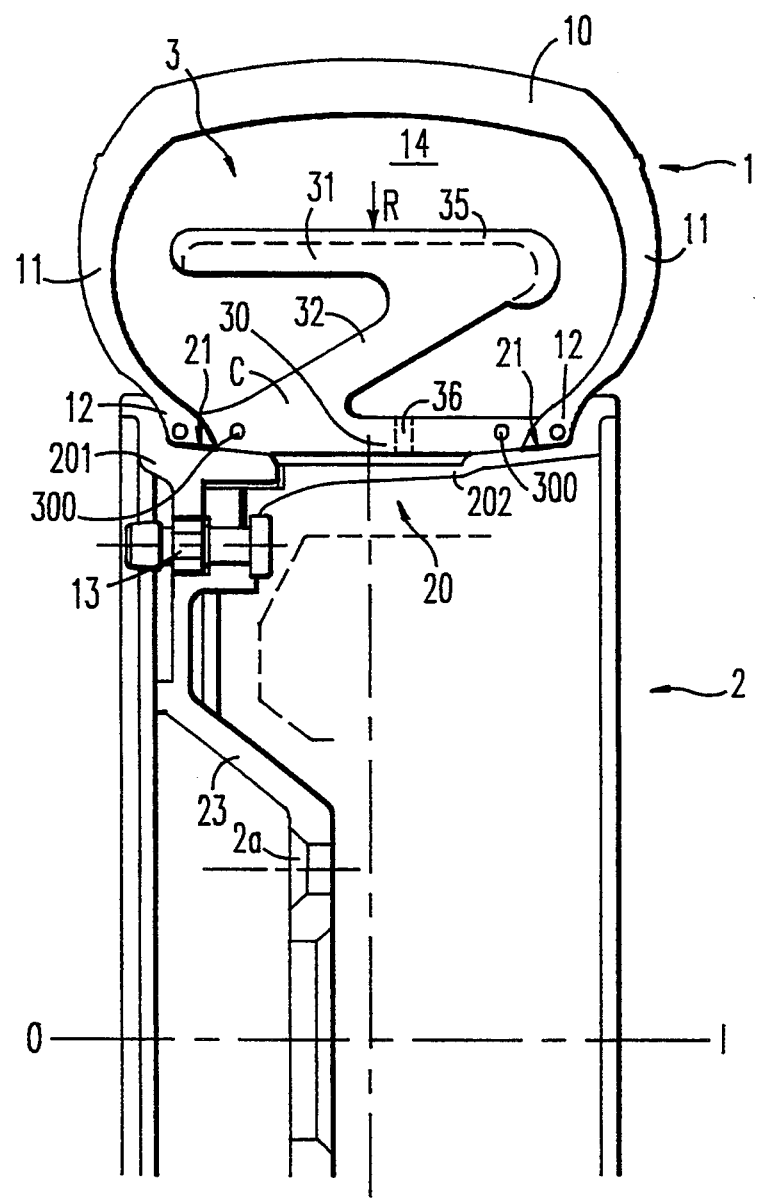
FIG. 1 is a partial meridian sectional view of a tire assembly equipped with the safety support according to the invention.

In FIG. 1, there is seen a completely ordinary vehicle tire 1, comprising a tread 10, two sides 11 and two beads 12 for providing the mechanical connection of tire 1 to wheel 2 having lug holes 2a for attachment to a vehicle. The latter comprises a rim 20, one part 201 of which is removable by bolts (not shown) and another part 202 of which forms a single piece with disk 23 of wheel 2. Rim 20 comprises two seats 21 which taper radially outward.

Safety support 3, in this example, has the general shape of a "Z," seen in meridian section. It comprises three parts: a base 30, a substantially cylindrical top 31 which is normally coaxial with the wheel rotational axis O-I and in axial alignment with the base, and a connection 32 joined between base 30 and top 31. The angle between the base 30 and the connection 32 is a least 30°. The support is preferably unitarily formed of elastic material.

When this support 3 is pushed radially inward by a radial force thereon, the movement of top 31 (in relation to base 30) is in both the radial direction and the axial direction (with respect to the wheel axis of rotation), due to the "Z" shape of the support. That is, the top 31, as seen in meridian section, can be thought of (i.e., simulates) as pivoting around an instantaneous center of rotation C relative to base 30 and rim 20 in response to radial inward forces. Action-reaction forces, due to flexure of the support necessarily result in the top 31 remaining parallel to the axis of rotation (O-I) of wheel 2 due to road-tire contact.

Figure 5:
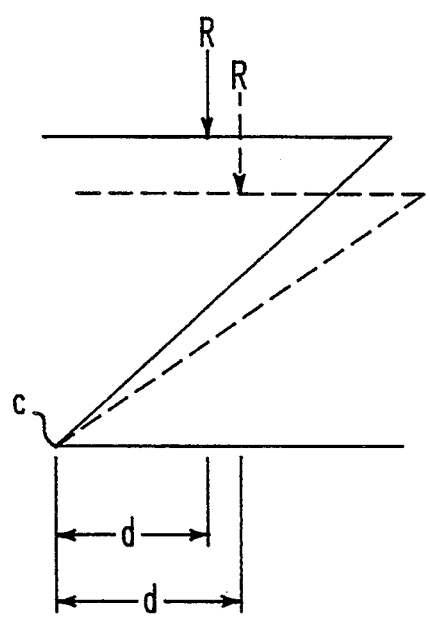

Of course, neither the connection 32 nor the top 31 actually pivot about the center C. Instead, this flexure approximates a pivoting about an instantaneous center of rotation C. That is, as shown in FIG. 5 the resultant reaction force R causes flexure of the connection 32, much like a leaf spring flexes along its length. This flexure provides a movement equivalent to, or simulating, pivoting about a single point. Moreover, since the resultant reaction force R is axially spaced from the instantaneous center of rotation C by the distance d, a moment force acting around center C will cause the top 31, and so the resultant R, to move axially inward (in the direction I; see dash lines in figure). Of course, as the top 31 moves axially inwardly, the distance d becomes larger (d'), and so the value of this moment will increase for a given reaction force R, thereby causing an increase of the bending of the support 3 at a constant load.

Support 3 is not symmetrical, as seen in meridian section. Its operation is therefore different depending on the direction of its mounting on rim 20. In the remainder of the description, "axially inside" designates a side oriented toward the inside I of the vehicle (with reference to the mounting position of the wheel) and "axially outside" a side oriented toward the outside O of the vehicle.

It has been found that the performance with reference to the quality of the handling of the vehicle is very different (and more favorable) in one mounting direction versus the other, and that in the illustrated favorable mounting direction this performance is much better than what is obtained with known supports. For this reason, by use of the contact between tread 10 and top 31, it is proposed to design the support 30 so that the resultant R of the forces exerted on said top 31, which in the absence of disturbances extends approximately radially and is centered in the middle of top 31, passes axially inside the instantaneous center of rotation C of top 31 in relation to rim 20, so as to produce an axial reaction in the desired direction.

When taking up the load in case of failure of tire 1, said top 31 necessarily rests on rim 20 of wheel 2. Consequently, the base 30 assures the bonding with rim 20 and connection 32 therefore joins said base 30 axially toward the outer side O of the vehicle, to provide the desired offset for the instantaneous center of rotation C of top 31 in the desired direction. By "bonding" on the rim is meant a connection such that there is no relative movement between base 30 and rim 20. If necessary, base 30 is reinforced with circumferentially extending rings 300.

The Z shape is very advantageous because it makes it possible to offset as much as possible the meeting point between connection 32 and base 30. It also makes it possible to offset in the opposite direction, i.e., toward the inside of the vehicle, the meeting point between connection 32 and top 31. This arrangement has a tendency to move toward the inside of the vehicle, and so to the inside of C, the point of application of the resultant of the forces R acting on top 31, and therefore to increase the bending of support 3 at a constant load. This has a favorable effect on the handling of the vehicle during the intervention of support 3. The "Z" shape also results in a base 30 whose width in the axial direction corresponds to the available space between beads 12 of tire 1, which makes it possible for support 3 to fulfill also the "locking of beads 12" function, necessary when driving at reduced or zero pressure.

Figure 3:
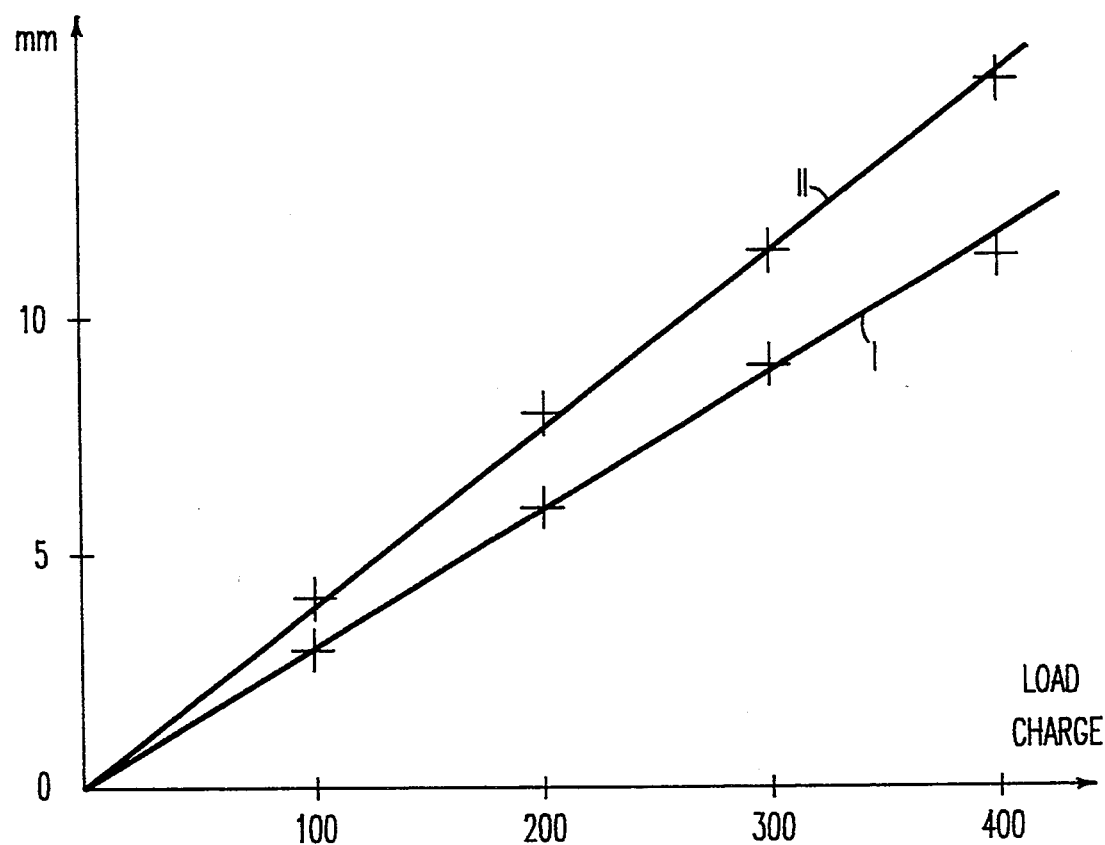
FIG. 3 shows performance differences as a function of the material used to make the support.

The material of the support should be elastic. The material chosen influences the flexibility of such a support 3 and therefore the gradualness of its intervention. Preferably, a polyurethane will be selected whose modulus of elasticity varies between 55 MegaPascal (curve I, FIG. 3) and 40 MegaPascal (curve II, FIG. 3), as measured on a test specimen with 2% extension and at 20° C.

EXAMPLE

Figure 4:
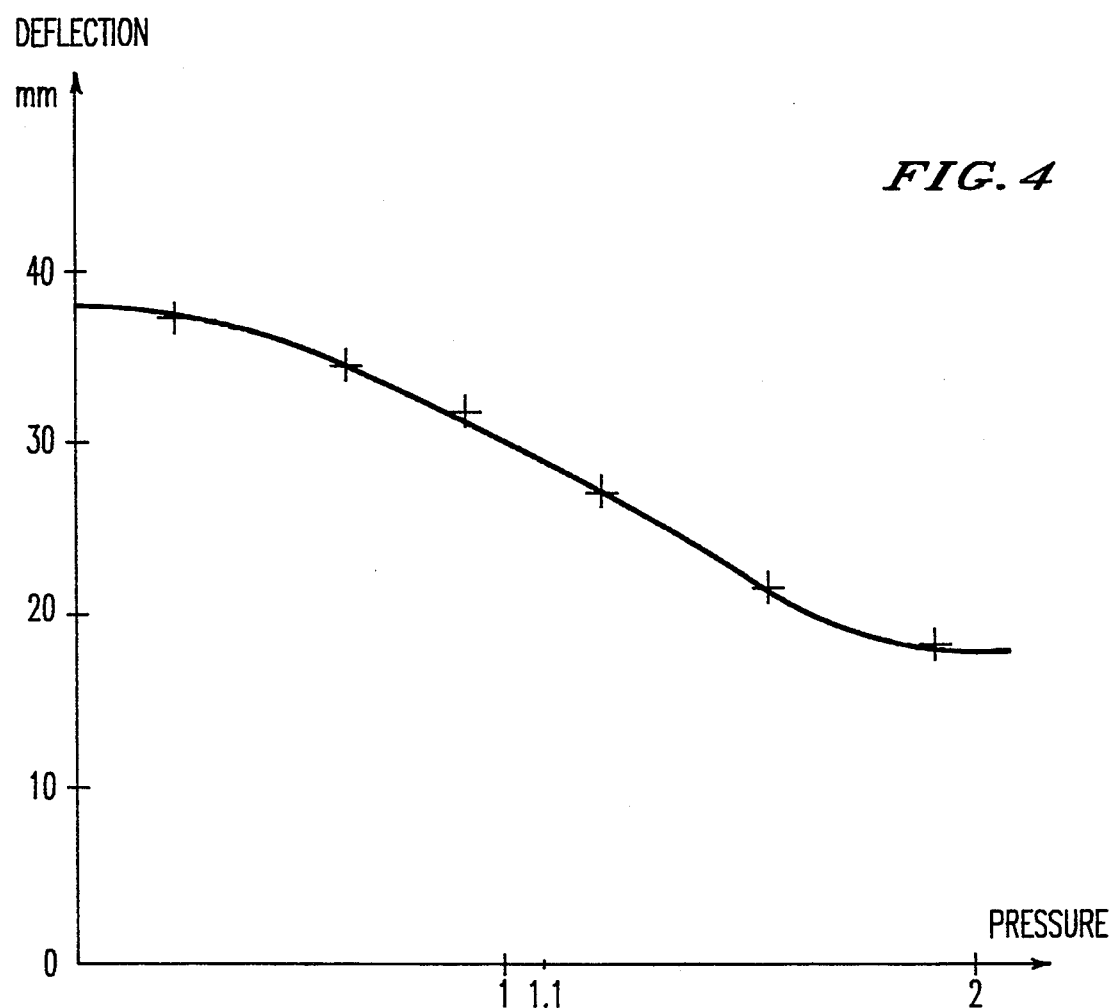
FIG. 4 illustrates the operation of a tire assembly equipped with the safety support, and FIG. 5 schematically illustrates the deflection of the support in response to a radially inward force thereon.

Support 3 was made of polyester TDI 4,4'-methylene bis ortho chloroaniline. The combination of the shape described and of the selection of this material produced a deflection curve for a tire 1-support 3 combination as a function of the inflation pressure of tire 1, as shown in FIG. 4. Tire 1 was of the Michelin 165/65 SR 13 MXL type.

At nominal pressure (2 bar), the deflection of tire 1 resulting from a static load of 380 decaNewton, was 19 mm. At that time there was a clearance of 10 mm between top 31 and tread 10. This clearance disappeared when the tire pressure fell to a pressure of 1.1 bar, which provided the threshold of intervention of support 3. The very good flexibility of support 3 gave a very gradual variation in the slope of the deflection curve for pressure values less than 1.1 bar. At zero pressure, there was observed a deflection of the tire 1 plus support 3 unit that was equivalent to 37/75 mm. This corresponded to a radial inward movement of 8 mm for the top 31 of support 3, at which time it took up the entire load, and to an increase in compression of the rubber of tread 10.

Figure 2:
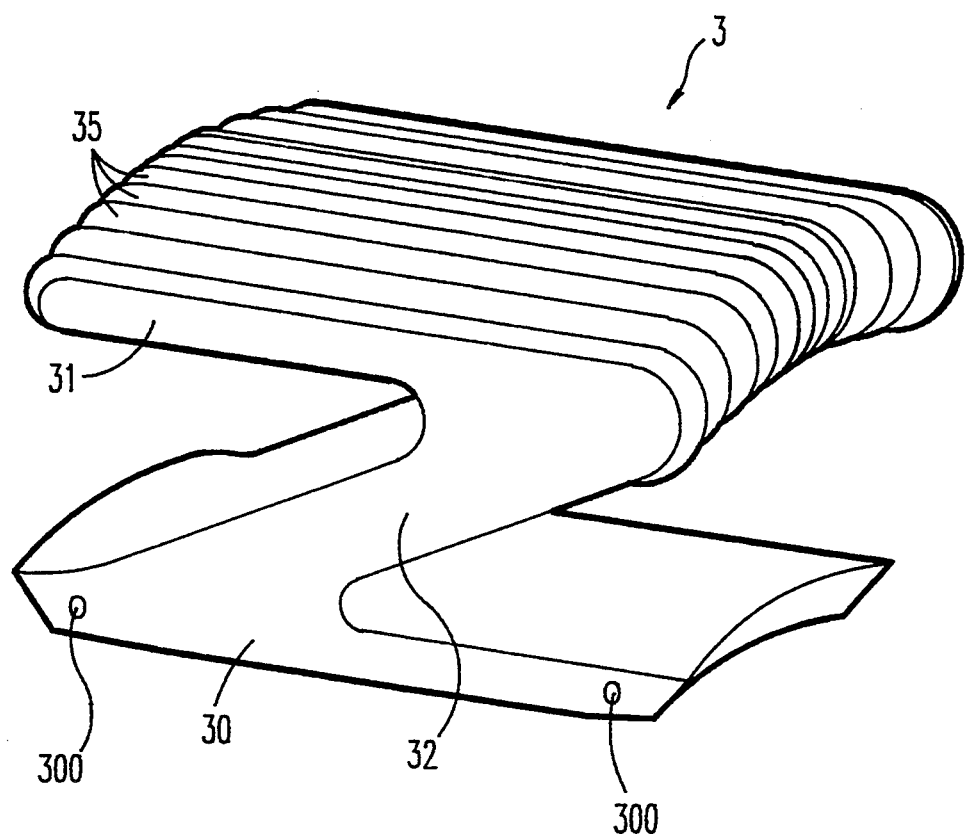
FIG. 2 is an orthogonal detail of the safety support.

FIG. 2 shows an optional feature wherein the radially outside face of top 31 comprises ribs 35 oriented approximately parallel to the axis of rotation of tire 1. In this example, the tread is reinforced, as is well known, by a belt having a length in the circumferential direction which is much greater than the circumferential length of top 31. The role of ribs 35 is to absorb the difference in circumference of top 31 and tread 10 by facilitating a relative sliding between the tread 10 and the top 31.

If ribs 35 are absent, the sliding friction produced between tread 10 and a smooth top 31 can also be tolerable, or else may be reduced by other palliatives known to a person skilled in the art.

Of course, it is necessary to perforate base 30 to make it possible for the inflation air to flow from valve 13 to tire cavity 14, or to provide any appropriate arrangement for this purpose. Apart from this perforation 36 and ribs 35, support 3 is a rotational solid produced by the rotation of the section appearing clearly in FIG. 1. However, this geometric feature is, of course, not limiting. Connection 32 could be provided by an assembly of individual arms. Base 30 could be only an extension of connection 32, the holding of beads 12 on their seats 21 being provided in another way. Base 30 could be designed to be mounted in a single piece rim via a mounting groove. Support 3 could be made in two or more pieces assembled inside the tire during mounting.

The details of implementation given in this description make it possible to produce a support 3 in a single piece, easy to release from the mold since there is no undercut, and which nevertheless is mounted very easily as follows: Support 3 is first made oval by extending it with a motor vehicle jack, or a specifically adapted extension cylinder, inside of it; support 3 is then introduced in the center of tire 1 by presenting it so that the major axis of the oval is approximately perpendicular to the median plane of said tire; the ovalization is freed; then an ovalization is caused whose major axis is parallel to the median plane of the tire, and is located inside of it; then, by a relative rotation of support 3 and tire 1, said support 3 is brought completely inside beads 12 and it is allowed to resume its natural circular shape; then the tire containing support 3 is attached on rim 20.

To illustrate the performance reached in road stability, a car was driven whose rear wheel on the outside of the turn was equipped with an assembly comprising support 3 as described above and a 165/65 SR 13 Michelin MXL tire at zero pressure. The test, consisting of making a turn with a radius equivalent to 40 m on a dry tarred pavement, gave the following results:

Speeds up to 60 km/hr were possible in the favorable direction of mounting and speeds only up to 50 km/hr were achieved with a support mounted on the wrong side, these speeds being reached at the limit of the side slip of the vehicle. During these tests, the tire 1 deflected according to curves I and II of FIG. 3 in response to loads applied thereto.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A safety support mounted to a vehicle wheel for supporting the tread of a vehicle tire in case of loss of inflation pressure of the vehicle tire, comprising:
    a base fixed to a rim of the wheel, said wheel being configured so as to be mounted to a vehicle such that an inside axial side of the wheel faces toward the vehicle and an outside axial side of the wheel faces away from the vehicle;
    a substantially cylindrical top normally positioned radially outside of said base in substantial axial alignment with said base and with an axis substantially coaxial with the wheel axis, wherein said top is normally radially spaced from said base such that when said support is positioned within an inflated tire mounted to the wheel rim, a radial clearance exists between said top and the tire tread; and
    a connection between said base and said top, comprising means for permitting a relative movement between said base and said top, wherein said connection joins said base substantially only at an axially outer side thereof and joins said top substantially only at an axially inner side thereof, relative to a plane perpendicular to the wheel axis and passing through an axial middle of said top, said axial outer side being axially offset from said axial inner side;
    whereby a resultant of forces acting on said top moves axially toward the inside side of the wheel during relative movement of the top towards the base.

2. The safety support of claim 1 wherein said support, when seen in meridian section, has a substantially Z shape, whereby said top can move both radially and axially, relative to said base in response to radial forces applied thereto.

3. The safety support of claim 2 wherein said support is unitarily formed from an elastic material.

4. The safety support of claim 3 wherein said elastic material is a polyurethane.

5. The safety support of claim 4 wherein said material has a modulus of elasticity of between 40 and 55 MegaPascal.

6. The safety support of claim 3 wherein said elastic material is polyester TDI 4,4′-methylene bis ortho chloroaniline.

7. The safety of support of claim 2 wherein said connection joins said base at an axially outside end of said base.

8. The safety support of claim 2, wherein an angle between said base and said connection of said substantially Z shape is at least 30°.

9. The safety support of claim 8, wherein the angle between said base and said connection of said substantially Z shape is about 30°.

10. The safety support of claim 1 wherein said base has such an axial width that said base substantially fills an axial space between beads of a tire mounted to the wheel.

11. The safety support of claim 1 including substantially circumferentially extending ribs formed on a surface of said top facing the tread of a tire mounted on the wheel.

12. The safety of support of claim 1 including circumferential reinforcement rings in said base.

* * * * *

UNITED STATES PATENT AND TRADEMARK OFFICE
CERTIFICATE OF CORRECTION

PATENT NO. : 5,363,894
DATED : November 15, 1994
INVENTOR(S) : Jacques Gouttebessis Et Al It is certified that error appears in the above-indentified patent and that said Letters Patent is hereby corrected as shown below:

Column 4, line 16, change "37/75" to --37.75--.

Signed and Sealed this

Twentieth Day of June, 1995

Attest:

BRUCE LEHMAN

Attesting Officer     Commissioner of Patents and Trademarks